United States Patent [19]

Ritter

[11] 4,074,891
[45] Feb. 21, 1978

[54] WINDING MECHANISM-DRIVE, PARTICULARLY FOR CONSTRUCTION CRANES OR LIKE HOISTING DEVICES

[75] Inventor: Kaspar Ritter, Kirchheim, Techk, Germany

[73] Assignee: KOPAT Gesellschaft fur Konstruktion, Entwicklung und Patentverwertung m.b.H. & Co. KG, Boll Kreis Goppingen, Germany

[21] Appl. No.: 641,737

[22] Filed: Dec. 18, 1975

[30] Foreign Application Priority Data

Dec. 20, 1974 Germany ............... 2460463

[51] Int. Cl.² ............................................. B66D 1/30
[52] U.S. Cl. ............................. 254/150 FH; 212/86; 254/173 R
[58] Field of Search ............ 254/150 FH, 173 R, 172, 254/186 R, 187 E; 60/445, 443, 905; 188/170, 75; 212/86

[56] References Cited

U.S. PATENT DOCUMENTS

| | | | |
|---|---|---|---|
| 2,178,305 | 10/1939 | Smaltz et al. | 254/172 |
| 2,574,378 | 11/1951 | Crookston | 254/172 |
| 3,465,850 | 9/1969 | Sexton | 188/70 |
| 3,477,695 | 11/1969 | Noly | 254/173 R |
| 3,481,584 | 12/1969 | Conry et al. | 254/172 |
| 3,523,614 | 8/1970 | Walker | 188/70 |
| 3,780,990 | 12/1973 | Edlund et al. | 254/173 R |
| 3,817,033 | 6/1974 | Appel et al. | 254/172 |

Primary Examiner—Lawrence J. Oresky
Attorney, Agent, or Firm—Martin A. Farber

[57] ABSTRACT

A winding mechanism-drive, particularly for construction cranes or the like hoisting devices, including a normal three-phase current-electromotor, a hydrostatic transmission with electronic-hydraulic servo-regulation for the continuous infinite variations of the feeding-speeds and -moments, the motor part of which is operatively connected with a cable drum preferably via a mechanical reduction transmission, as well a spring force-actuated locking brake for the cable drum automatically electro-hydraulically releasing in the balanced condition between load moment and drive moment. The winding mechanism-drive is characterized by the quasi-stationary part of the locking brake, such as for example the brake cheeks with presser linkage rods and releasable spring force-actuating element, being slightly pivotally mounted about an axis concentric to the drive shaft of the hydraulic motor, and standing in cooperative connection with an electric switch in the release circuit for the locking brake, such that the brake is automatically released only with a —minimum— pivotal movement of the brake linkage in a direction of lifting.

6 Claims, 5 Drawing Figures

WINDING MECHANISM-DRIVE, PARTICULARLY FOR CONSTRUCTION CRANES OR LIKE HOISTING DEVICES

This invention relates to a winding mechanism-drive in general, and to a winding mechanism-drive, particularly for construction cranes or the like hoisting devices, including a normal three-phase current-electromotor, a hydrostatic transmission with electronic-hydraulic servo-regulation for the continuous infinite variations of the feeding-speeds and -moments, the motor part of which is operatively connected with a cable drum preferably via a mechanical reduction transmission, as well a spring force-actuated locking brake for the cable drum automatically electro-hydraulically releasing in the balanced condition between load moment and drive moment, in particular.

With a prior known hydrostatic transmission for hoisting devices according to German Auslegeschrift DAS No. 2 337 699 relating to the general subject of the present invention, the task to be solved by this transmission resides therein with a hydrostatic transmission with an adjustment pump and a setting or adjustment motor moving the load, the output member of which is provided with a blocking or locking brake, the disengaging device of which brake is set in operation by a switching unit during the starting operation of the load as soon as the high pressure of the transmission has reached a value (equilibrium) holding the balance or equilibrium of the load, whereby the transmission, besides the usual auxiliary equipment (feeding pump, pressure relief member) has an auxiliary pump, to attain that, with every operating condition which is employed, the desired lifting- and lowering- speed, and the stationary inoperative condition of the load, respectively, is maintained in spite of load variations.

This task is solved by the prior known transmission in the manner that, at least in the phases of the hydrostatic equilibrium and of the running or starting operation of the load, a part of the feed quantity or capacity of the auxiliary pump is fed in the high pressure line, the other part of which is fed to a liquid container over an adjustable servo-pressure relief member which is controlled by an electronic switching unit, whereby the switching unit continuously compares the value of the moment of resistance of the load with the value of the high pressure of the transmission and the liquid quantity fed to the transmission-high pressure line by the auxiliary pump via the operation of the pressure relief member changes the high pressure of the transmission in a sense compensating the load variation. Such a transmission already requires, as a consequence of the required additional auxiliary pump, as compared to a normal hydrostatic transmission comprising pumps- and motor- part as well a feeding pump, a comparatively high technical and economical expenditure. Moreover, yet also the control of the release device for the holding brake in dependency on the balance or equilibrium between the load resistance moment measured by a pick-up or sensor and a drive moment determined by a transmission-high pressure pick-up or sensor with the arrangement of the load-resistance pick-up in an almost rigid connecting rod also with the use of extremely sensitive and correspondingly costly measuring devices, offers no guarantee that in practice in all operating conditions, an actual jerk- or jolt-free driving or starting up of the load in a lifting- and/or lowering- direction will be achieved.

It is an object of the present invention to produce a winding mechanism-drive, whereby with the lowest possible expense, any slightest incipient stalls of the load during starting-up from the inoperative position as well as in lifting- and lowering- direction can be avoided with sureness and safety. This object in substance is solved in accordance with the invention in that the quasi-stationary part of the locking brake, such as for example the brake cheeks with pressing rods or linkage and releasable spring force-actuating element, is slightly pivotally mounted about an axis concentric to the drive shaft of the hydraulic motor, and stands in cooperating operative connection with an electric switch in the release circuit for the locking brake, such that the brake is automatically released only, or merely, with a — minimum — pivotal movement of the brake linkage or rods in a direction of lifting. By this construction it is guaranteed that the brake is automatically released independent of the absolute size of the respective load to be hoisted from time to time and of the size of the slippage in the transmission, first, or only at the moment in which an exact equilibrium or balance prevails between the load moment and the drive-rotational moment on the cable drum and the brake which is in mechanical connection with the latter. From such an equilibrium condition positively to be brought about before the release of the brake and mechanically controllable, only then does there occur a completely smooth transmission, without jerks or jolts, for the lifting and lowering, respectively, of the load.

An advantageous further embodiment of the inventive winding mechanism-drive resides in that, in the closed pressure means circuit of the hydrostatic transmission there is arranged an electro-hydraulically operated anticipatory servo controllable short-circuit valve which connects the pressure-conduit and the suction-conduit, and which is controlled such that with every locking of the locking brake, the transmission automatically is uncoupled and with operation of the drive lever out of its zero position is automatically coupled-in. By such an embodiment of the winding mechanism-drive any additional loading or resistance of the brake for once is set aside or eliminated by the drive motor with safety, and simultaneously the idle no load output of the drive motor is reduced to the lowest value during all inoperative periods of the winding mechanism, and thus the total consumption of drive energy is considerably reduced.

A preferred embodiment of the winding mechanism-drive in accordance with the invention further resides in that the hydrostatic transmission forms in a per se known manner respectively a volume variable pump- and motor- part in a compact constructional arrangement (a "back to back" arrangement). Such a transmission namely in itself by avoidance of all external high pressure-connection conduits, combines a particularly important highest operational safety precisely for the drive of hoisting apparatus with reduced space requirements and favorable output or efficiency, such that it makes possible an almost ideal infinitely variable hoisting mechanism-drive with the use of a normal rotary current-electromotor as an energy source.

With the above and other objects in view, the invention will become more clearly understood in connection with the detailed description of a preferred embodiment when considered along with the accompanying drawings, of which:

Figure 1:
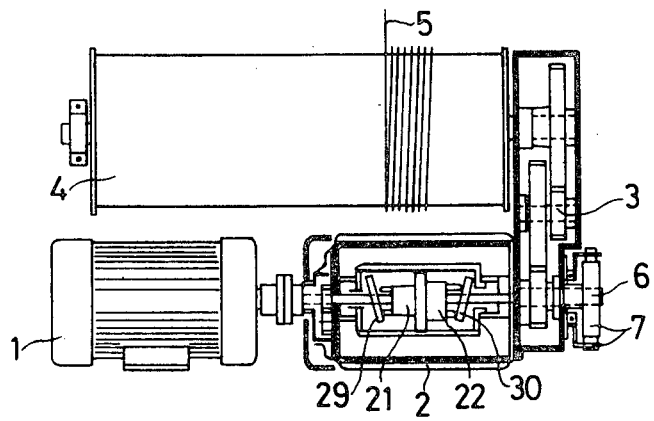
FIG. 1 is a schematic ground view showing the entire arrangement of a winding mechanism-drive of the invention.
Figure 3:
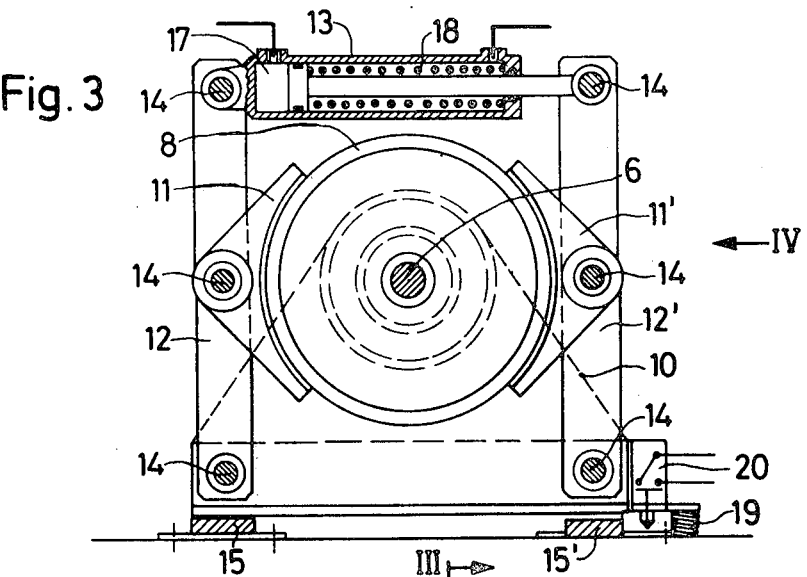
FIG. 3 is a longitudinal section of the locking brake taken along the lines III — III in FIG. 4 in enlarged view.
Figures 4, 5:
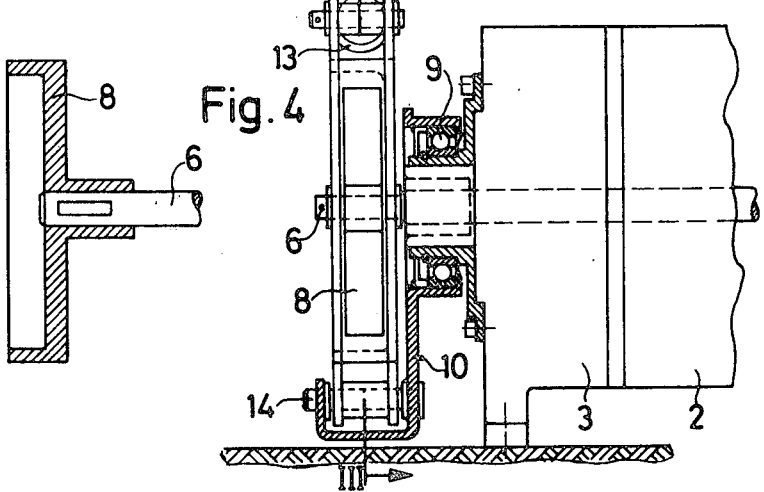
FIG. 4 is a section of the same locking brake viewed in the direction of the arrow IV of FIG. 3.
FIG. 5 is a cross-sectional view of the brake drum of the locking brake.

Referring now to the drawings, the illustrated winding mechanism- or winch- drive in accordance with the invention comprises a normal three-phase or rotary current electromotor 1, which over an infinitely variable hydrostatic drive or transmission 2 with thereafter series inserted mechanical reduction gearing or transmission 3, permits a rope or cable drum 4 to be driven in any desired rotational direction and rotational speed variable within wide limits, for the winding on and winding off of a hoisting winding cable 5. On a shaft 6 of the mechanical reduction gearing 3, which shaft is always non-rotatably connected with the cable drum 4, there is arranged a locking brake 7, the particular construction thereof being illustrated in FIGS. 2 - 5. As evident from the schematic pressure means circuit diagram and the electrical locking circuit diagram of FIG. 2 and the illustrations of the locking brake in FIGS. 3 - 5, the quasi-"stationary" part of the locking brake 7 (which part coperates with the brake drum 8 on the drive shaft 6) is held with the aid of a traverse or crossover member 10, the latter being mounted slightly or somewhat pivotally on the mechanical transmission, concentric to the shaft 6, by means of a ballbearing 9, such that this quasi-stationary part of the locking brake (which part comprises the traverse 10, the brake shoes 11, 11' with pressing rods or linkage 12, 12' and the hydraulically releasable spring force - actuating element 13 as well as the connection bolts 14) can undergo small angular swinging movements in the directions of the arrows 16, 16', respectively, limited by abutment stops 15, 15'.

With a stationary winding mechanism and a liquid space 17 not under pressure, the brake shoes 11, 11' are pressed by a prestressed spring 18 inside on actuating element 13 via the bending-resistant or rigid rods 12, 12' on the brake drum 18. Thereby the entire quasi-stationary part of the locking brake including the traverse 10 is held in engagement on the abutment 15 by the pretension of a comparatively weak spring 19 acting on an extension of the quasi-stationary part of the brake in the sense of the arrow 16, such that a switch 20 which acts as a contact is opened. As may be seen further from the schematic diagram of the pressure means circuit in FIG. 2, disposed therein is the hydrostatic transmission 2 driven by the electromotor 1 with constant rotational speed and rotational direction, the transmission comprising the pump part 21 and the motor part 22 with adjustable feed- and absorption- volume, respectively, in the closed circuit as well as a supply or charging pump 23, the hydrostatic transmission being in idle no load position with opened decoupling valve 25 (the valve 25 being actuatable by a servo valve 24) and stationary drive moment-free and with different rotational direction and infinitely variable rotational speed driveable output shaft 6 (the shaft 6 forming simultaneously the input shaft of the mechanical reduction transmission 3) and hydraulic operating liquid being fed from the charging or supply pump 23 over a servo valve 26 and an inflation or filling pressure valve 27 in the circuit out and again into the transmission sump 28.

Figure 2:
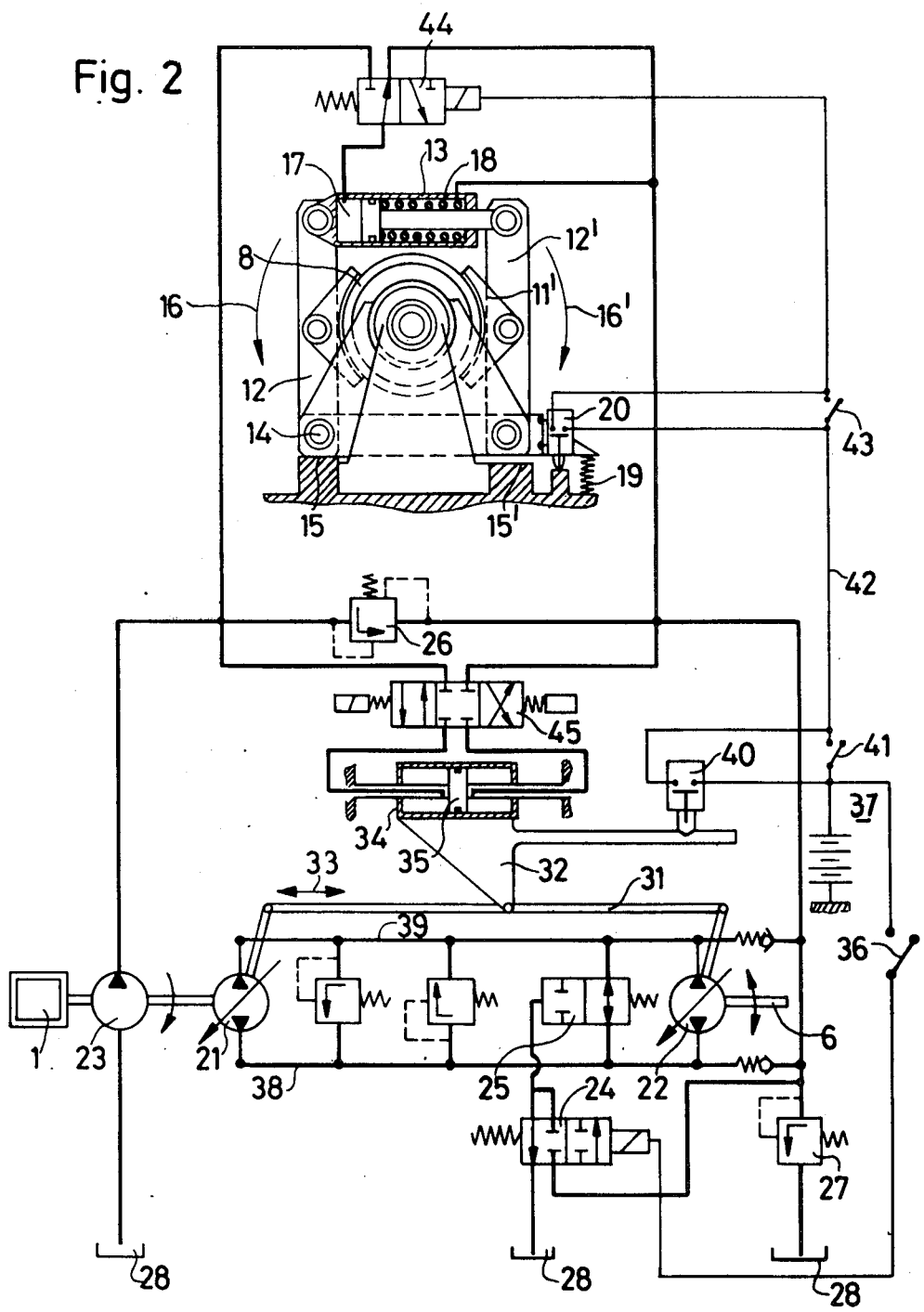
FIG. 2 is a schematic circuit diagram of the pressure means and the electric locking-circuit (without the electronic control and power control)

In order to change the reduction gearing or transmission ratio in the hydrostatic transmission 2 which comprises the pump part 21 and the motor part 22 in a compact structural arrangement, the swinging bodies 29 and 30 of both parts, e.g., can be adjusted by means of a schematically illustrated connection rod or linkage 31, 32 in either directional sense of the double arrow 33 to different angles of inclination by a servo adjustment displacing cylinder 34 with stationary piston 35. In this manner the adjustment cylinder 34 is moved or shifted to one or the other side of the piston 35 depending on the movement or deflection of a, in known per se manner by a, not illustrated potentiometer which is acted on or influenceable by a manually actuated selection lever and of an electro-hydraulic servo valve spool or distributing slide valve servo-piston 45, the latter influenced by the potentiometer, i.e. towards the one or the other side from the center bearing position as shown in FIG. 2. With every actuation of the selection lever from its zero position, a relay 36 is simultaneously closed in the current or power supply 37 for the servo valve 24, and thereby the shortcircuit valve 25 is brought into its position separating the high pressure conduits 38, 39 of the hydrostatic transmission 2. Simultaneously by a switch 40 acting as a contact or latch, and actuated by the adjusting linkage 32, a first relay 41 is closed in the current or power feed line 42 for the electro-hydraulic servo valve 44 for the brake actuating element 13. Now, as soon as the start of the charging or supply of the pump part 21 occurs, there arises on the output shaft 6 of the transmission 2, a rotational moment slightly exceeding the load moment at first always in lifting direction — arrow direction 16' —, at the same instant (independent of the absolute size of the load moment acting in the direction of the arrow 16 on the quasi-stationary part of the locking brake) the switch 20 for a second relay 43 is closed, so that the electro-hydraulic valve 44 reaches its position opening or releasing the engagement of the actuating element 13, and thus the locking brake 7 is released.

By any arbitrary or also unintentional inadvertent breaking or interruption of the circuit 42 for the release servo valve 44 for the brake actuating element 13, the locking brake 7 is instantaneously applied or engaged again by the action of the pretensioned spring 18. With the entering of the servo-adjustment displacement cylinder 34 into the zero position, by release of the relay 36 in the circuit 37, in addition the operative force connection in the hydrostatic transmission 2 is interrupted by short circuiting of the suction— and pressure feed — conduits 38, 39.

While I have disclosed one embodiment of the present invention, it is to be understood that this embodiment is given by example only and not in a limiting sense.

I claim:

1. In a winding mechanism-drive, particularly for construction cranes or like hoisting devices, comprising a rotary current-electromotor, and a hydrostatic transmission with electronic - hydraulic servo-regulation for infinite variations of feeding speeds and feeding moments, the transmission having a hydraulic motor part with a drive shaft operatively connected with a cable drum preferably by means of a mechanical reduction transmission, and a spring force-actuated locking brake for the cable drum automatically electro-hydraulically being released in a balanced condition between load moment and drive moment, the improvement comprising a locking brake including a quasi- stationary part, said quasi-stationary part being slightly-limitedly pivotally mounted about an axis concentric to the drive shaft of the hydraulic motor part, bearing means concentric with said drive shaft for pivotally mounting said quasi-stationary part, release circuit means for releasing said locking brake, an electric switch means electrically connected in said release circuit means and mechanically operatively connected with said quasi-stationary part of said locking brake for actuation of said release circuit means for the automatic release of said locking brake only upon a minimum predetermined pivotal movement of said quasi-stationary part of said locking brake in a direction of lifting.

2. In a winding mechanism-drive, the improvement as set forth in claim 1, further comprising a closed pressure liquid circuit in the hydrostatic transmission including a pressure conduit and a suction conduit, an electro-hydraulically actuated anticipatory servo controlled short-circuit decoupling valve connected between said pressure conduit and said suction conduit, means for controlling said short-circuit valve upon every locking of said locking brake such that said hydrostatic transmission automatically is decoupled out of operation, and upon operation of a selection drive lever out of its zero position said hydrostatic transmission is automatically operatively coupled for operation thereof.

3. In a winding mechanism-drive, the improvement as set forth in claim 1, wherein
the hydrostatic transmission includes a volume variable pump part and motor part respectively in a compact back to back constructional arrangement.

4. In a winding mechanism-drive the improvement as set forth in claim 1, wherein
said locking brake includes a brake drum secured to the drive shaft of said motor part of said hydrostatic transmission,
said quasi-stationary part of said locking brake includes a traverse member pivotally mounted via said bearing means about and relative to the drive shaft of said motor part of said hydrostatic transmission, and a linkage, including brake cheeks, connected to said traverse member, as well as a spring force-actuating means for pressing said linkage and said brake cheeks into operative locking engagement with said brake drum and for releasing said brake cheeks by a pressurized-liquid actuation thereof by said release circuit means upon an initiating driving pivoting of said drive shaft of said motor part of said hydrostatic transmission is the direction of lifting of a load by said minimum predetermined pivotal movement,
abutment means operatively cooperating with said quasi-stationary part of said locking brake for limiting the pivotal movement of said quasi-stationary part of said locking brake.

5. The improvement, as set forth in claim 1, wherein
said locking brake includes a brake drum directly mechanically coupled with the cable drum and operatively cooperating with said quasi-stationary part of said locking brake.

6. The improvement, as set forth in claim 4,
said bearing means comprises ball bearing means for pivotally mounting said traverse member about and relative to the drive shaft.

* * * * *